United States Patent
Shen et al.

(10) Patent No.: US 9,916,331 B2
(45) Date of Patent: Mar. 13, 2018

(54) METHOD AND DEVICE FOR AUTOMATICALLY PROCESSING STATIC TEST DATA OF RAIL TRANSIT VEHICLE

(71) Applicant: CRRC QINGDAO SIFANG CO., LTD., Qingdao, Shandong (CN)

(72) Inventors: Huabo Shen, Shandong (CN); Shun Xu, Shandong (CN); Jianbo Zhao, Shandong (CN); Jie Chang, Shandong (CN); Qiliang Zheng, Shandong (CN); Chenyang Bing, Shandong (CN); Haogang Wu, Shandong (CN); Yao Wang, Shandong (CN); Qunjiang Zhu, Shandong (CN); Peiyuan Song, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/119,329

(22) PCT Filed: Oct. 29, 2015

(86) PCT No.: PCT/CN2015/093212
§ 371 (c)(1),
(2) Date: Aug. 16, 2016

(87) PCT Pub. No.: WO2016/082649
PCT Pub. Date: Jun. 2, 2016

(65) Prior Publication Data
US 2017/0011070 A1     Jan. 12, 2017

(30) Foreign Application Priority Data
Nov. 26, 2014 (CN) .......................... 2014 1 0697051

(51) Int. Cl.
*G06F 17/30* (2006.01)
*G01M 17/08* (2006.01)

(52) U.S. Cl.
CPC ....... *G06F 17/30289* (2013.01); *G01M 17/08* (2013.01); *G06F 17/3053* (2013.01); *G06F 17/30569* (2013.01)

(58) Field of Classification Search
CPC ........... G06F 17/30289; G06F 17/3053; G06F 17/30569
See application file for complete search history.

(56) References Cited

U.S. PATENT DOCUMENTS

| | | | |
|---|---|---|---|
| 7,327,228 B2 | 2/2008 | Min | |
| 8,417,715 B1 * | 4/2013 | Bruckhaus | G06F 17/30994 705/26.1 |

(Continued)

FOREIGN PATENT DOCUMENTS

| | | |
|---|---|---|
| CN | 102801752 A | 11/2012 |
| CN | 103376380 A | 10/2013 |

(Continued)

OTHER PUBLICATIONS

Manual S. Pereira, Structural Crashworthiness of Railway Vehicles, 2005, 15 pages.*

(Continued)

*Primary Examiner* — Noosha Arjomandi
(74) *Attorney, Agent, or Firm* — U.S. Fairsky LLP; Yue Xu (57) ABSTRACT

A method and device for automatically processing static test data of a rail transit vehicle are provided. A target operation step is determined in accordance with a commissioning template. Information about a commissioning task step is sent to a terminal device, for prompting that the target operation step needs to be executed. After the information (Continued)

about a commissioning result corresponding to the target operation step is received, it is judged whether test data in the information is correct. If it is judged that the test data is correct, the information is sent to the terminal device, the judgement result is filled into the commissioning template, and a step of determining the target operation step is executed. If it is judged that the test data is incorrect, the information is sent to the terminal device, and the judgement result is filled into the commissioning template.

10 Claims, 2 Drawing Sheets

(56) References Cited

U.S. PATENT DOCUMENTS

| | | | |
|---|---|---|---|
| 9,618,910 B2* | 4/2017 | Nikhra | G05B 13/02 |
| 9,842,175 B2* | 12/2017 | Steinberg | G06F 17/30961 |
| 2006/0122816 A1* | 6/2006 | Schadt | G06F 19/18 |
| | | | 703/11 |
| 2006/0173825 A1* | 8/2006 | Hess | G06F 17/30058 |
| 2007/0050105 A1 | 3/2007 | Chinnadurai et al. | |
| 2008/0065705 A1* | 3/2008 | Miller | G05B 21/02 |
| 2008/0168011 A1* | 7/2008 | Steinberg | G06K 9/6282 |
| | | | 706/12 |
| 2008/0248500 A1* | 10/2008 | Semmes | G01N 33/57434 |
| | | | 435/7.23 |
| 2010/0312461 A1* | 12/2010 | Haynie | B61L 25/025 |
| | | | 701/117 |
| 2011/0035161 A1* | 2/2011 | McFadden | G01T 1/203 |
| | | | 702/28 |
| 2015/0142498 A1* | 5/2015 | Remacle | G06Q 10/0633 |
| | | | 705/7.23 |
| 2016/0335391 A1* | 11/2016 | Bing | G06F 3/06 |
| 2017/0067733 A1* | 3/2017 | Wei | G01B 11/24 |
| 2017/0153633 A1* | 6/2017 | Christensen | G05B 19/41865 |

FOREIGN PATENT DOCUMENTS

| | | |
|---|---|---|
| CN | 103543022 A | 1/2014 |
| CN | 103810092 A | 5/2014 |
| CN | 103823145 A | 5/2014 |
| CN | 104022933 A | 9/2014 |
| CN | 104503429 A | 4/2015 |

OTHER PUBLICATIONS

Translation of the First Office Action for CN 201410697051.4, dated Sep. 2, 2016.
International Search Report for PCT/CN2015/093212, dated Feb. 4, 2016, ISA/CN.

* cited by examiner

METHOD AND DEVICE FOR AUTOMATICALLY PROCESSING STATIC TEST DATA OF RAIL TRANSIT VEHICLE

The present application is a national phase of International Application No. PCT/CN2015/093212, titled "METHOD AND DEVICE FOR AUTOMATICALLY PROCESSING STATIC PEST DATA OF RAIL TRANSIT VEHICLE", filed on Oct. 29, 2015, which claims priority to Chinese Patent Application No. 201410697051.4, titled "METHOD AND DEVICE FOR AUTOMATICALLY PROCESSING STATIC TEST DATA OF RAIL TRANSIT VEHICLE", filed on Nov. 26, 2014 with the State Intellectual Property Office of People's Republic of China, which are incorporated herein by reference in their entirety.

FIELD

The present disclosure relates to the technical field of information processing, and in particular to a method and a device for automatically processing rail transit vehicle static test data.

BACKGROUND

At present, in commissioning of a rail transit vehicle (such as a motor train unit, or a subway vehicle), test data of the commissioning are recorded and stored in a paper file. In a case of a heavy task, a large amount of paper forms need to be filled, bringing hard work to a commissioner and resulting in low efficiency of commissioning because the test data are all filled manually.

Therefore, it is desired to improve the efficiency of commissioning.

SUMMARY

An object of the present disclosure is to provide a method and a device for automatically processing rail transit vehicle static test data in order to improve the efficiency of commissioning.

In order to achieve the above object, the following technical solutions are provided according to the present disclosure.

A method for automatically processing rail transit vehicle static test data, includes:

determining a target operation step based on an execution sequence of operation steps of a commissioning task in a commissioning template, where the commissioning template includes the commissioning task, the operation steps of the commissioning task, the execution sequence of the operation steps, information which needs to be confirmed after each of the operation steps is performed, and an interacting region for filling a judgment result corresponding to the confirmed information;

sending commissioning task step information to a terminal device for prompting to perform the target operation step;

receiving a data stream from the terminal device, where the data stream includes an attribute of transmitted data which are commissioning result information corresponding to the target operation step, and the commissioning result information includes test data corresponding to the target operation step, the target operation step, the commissioning task to which the target operation step belongs, and an identifier of the terminal device sending the commissioning result information;

parsing the received data stream to obtain the commissioning result information;

judging whether the test data corresponding to the target operation step are correct based on a criterion corresponding to the target operation step, where the criterion is determined based on an attribute of data of a rail transit vehicle static commissioning test; and sending judgment result information to the terminal device, filling the judgment result into the commissioning template and performing the step of determining a target operation step based on an execution sequence of operation steps of a commissioning task in a commissioning template, in a case that it is judged that the test data corresponding to the target operation step are correct;

sending the judgment result information to the terminal device, and filling the judgment result into the commissioning template in a case that it is judged that the test data corresponding to the target operation step are not correct.

Preferably, in the above method, the operation steps are ranked in accordance with the execution sequence and are expressed using a predetermined working procedure organizing algorithm in the commissioning template.

Preferably, the above method further includes:

pushing an updated commissioning template to the terminal device when the commissioning template is updated.

Preferably, the above method further includes:

sending the commissioning template to a commissioning terminal which sends a commissioning template downloading request when the commissioning template downloading request is received from the terminal device.

Preferably, in the above method, parsing the received data stream to obtain the commissioning result information includes:

determining a data organizing algorithm based on the attribute of transmitted data carried in the data stream; and parsing the data stream to obtain the test data based on the determined data organizing algorithm.

A device for automatically processing rail transit vehicle static test data, includes:

a first determining module, configured to determine a target operation step based on an execution sequence of operation steps of a commissioning task in a commissioning template, where the commissioning template includes the commissioning task, the operation steps of the commissioning task, the execution sequence of the operation steps, information which needs to be confirmed after each of the operation steps is performed, and an interacting region for filling a judgment result corresponding to the confirmed information;

a first sending module, configured to send commissioning task step information to a terminal device for prompting to perform the target operation step;

a receiving module, configured to receive a data stream from the terminal device, where the data stream includes an attribute of transmitted data which are commissioning result information corresponding to the target operation step, and the commissioning result information includes test data corresponding to the target operation step, the target operation step, the commissioning task to which the target operation step belongs, and an identifier of the terminal device sending the commissioning result information;

a parsing module, configured to parse the received data stream to obtain the commissioning result information;

a judging module, configured to judge whether the test data corresponding to the target operation step are correct based on a criterion corresponding to the target operation step, where the criterion is determined based on an attribute of data of a rail transit vehicle static commissioning test;

a first processing module, configured to send judgment result information to the terminal device, fill the judgment result into the commissioning template and trigger the first determining module to perform the step of determining a target operation step based on an execution sequence of operation steps of a commissioning task in a commissioning template, in a case that the judging module judges that the test data corresponding to the target operation step are correct; and a second processing module, configured to send the judgment result information to the terminal device, and fill the judgment result into the commissioning template, in a case that the judging module judges that the test data corresponding to the target operation step are not correct.

Preferably, in the above device, the operation steps are ranked in accordance with the execution sequence and are expressed using a predetermined working procedure organizing algorithm in the commissioning template.

Preferably, the above device further includes:

a pushing module, configured to push an updated commissioning template to the terminal device when the commissioning template is updated.

Preferably, the above device further includes:

a second sending module, configured to send the commissioning template to a commissioning terminal which sends a commissioning template downloading request when the commissioning template downloading request is received from the terminal device.

Preferably, in the above device, the parsing module includes:

a determining unit, configured to determine a data organizing algorithm based on the attribute of transmitted data carried in the data stream; and a parsing unit, configured to parse the data stream to obtain the test data based on the determined data organizing algorithm.

It follows from the above technical solution that, in the method and the device for automatically processing rail transit vehicle static test data according to the embodiments of the present disclosure, the target operation step is determined based on the execution sequence of the operation steps of the commissioning task in the commissioning template. The commissioning task step information is sent to the terminal device for prompting to perform the target operation step. After the commissioning result information corresponding to the target operation step is received from the terminal device, it is judged whether the test data in the commissioning result information are correct based on the criterion corresponding to the target operation step. The criterion is determined based on the data attribute of the rail transit vehicle static test. If it is judged that the test data corresponding to the target operation step are correct, the judgment result information is sent to the terminal device, the judgment result is filled into the commissioning template, and the step of determining a target operation step based on an execution sequence of operation steps of the commissioning task is executed. If it is judged that the test data corresponding to the target operation step are not correct, the judgment result information is sent to the terminal device and the judgment result is filled into the commission template.

Therefore, with the method and the device for automatically processing rail transit vehicle static test data according to the embodiments of the present disclosure, the commissioning procedure, the commissioning result data and the judgment result made on the commissioning result data are associated with each other through the commissioning template to automatically process the test data in the commissioning procedure, thereby improving the efficiency of commissioning.

BRIEF DESCRIPTION OF THE DRAWINGS

The accompanying drawings needed to be used in the description of the embodiments or the conventional technology are described briefly as follows, so that the technical solutions according to the embodiments of the present disclosure or according to the conventional technology become clearer. It is apparent that the accompanying drawings in the following description are only some embodiments of the present disclosure. For those skilled in the art, other accompanying drawings may be obtained according to these accompanying drawings without any creative work.

DETAILED DESCRIPTION OF EMBODIMENTS

The technical solution according to the embodiments of the present disclosure is described clearly and completely as follows in conjunction with the accompanying drawings in the embodiments of the present disclosure. It is apparent that the described embodiments are only a part of the embodiments according to the present disclosure. All the other embodiments obtained by those skilled in the art based on the embodiments in the present disclosure without any creative work fall into the scope of the present disclosure.

Tests for a rail transit vehicle are normally classified into a type of rail transit vehicle static test and a type of rail transit vehicle dynamic test. The present disclosure is to provide a method and a device for processing test data of a rail transit vehicle static test. The method and the device for automatically processing test data of a rail transit vehicle static test according to embodiments of the present disclosure may be applied in a server.

Figure 1:
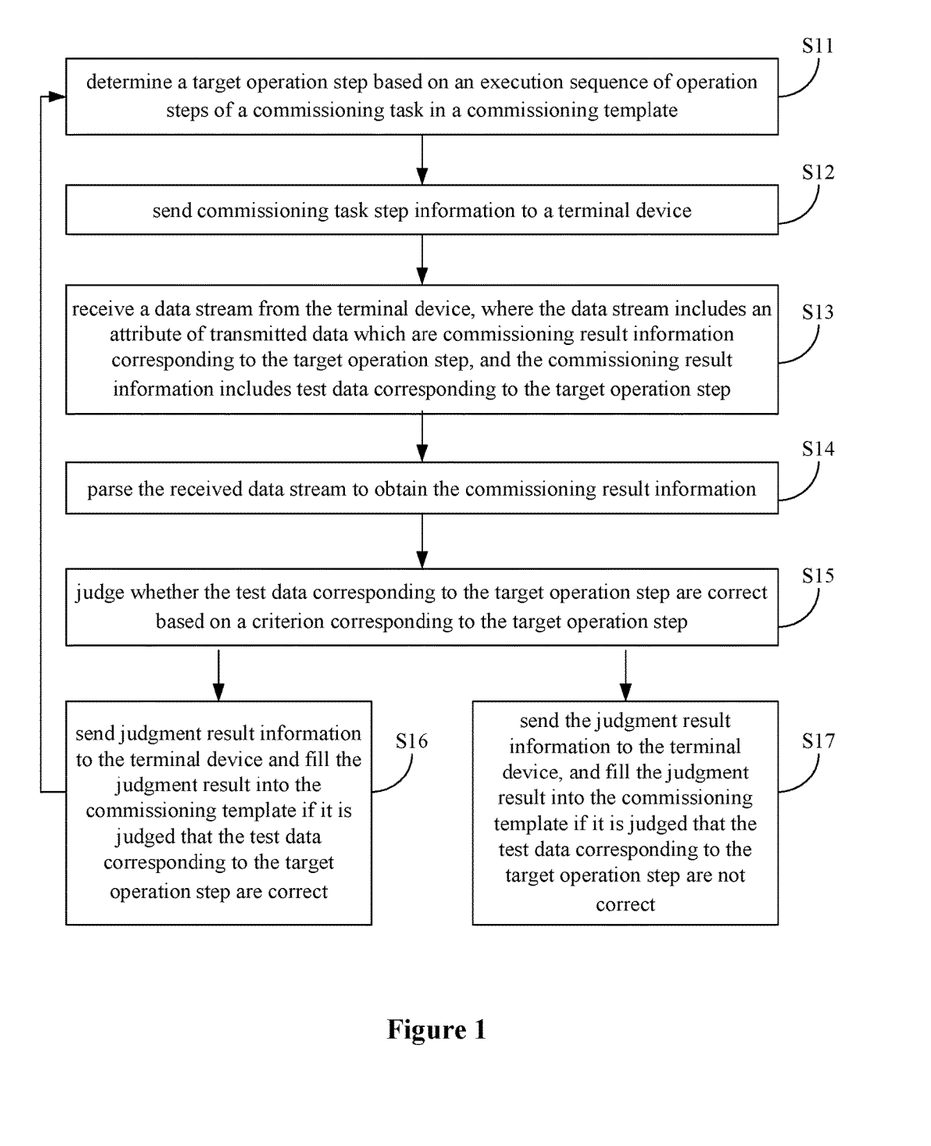
FIG. 1 is a flowchart of a method for automatically processing rail transit vehicle static test data according to an embodiment of the present disclosure.

FIG. 1 is a flowchart of a method for automatically processing rail transit vehicle static test data according to an embodiment of the present disclosure. Referring to FIG. 1, the method may include step S11 to step S17.

In step S11, it is determined a target operation step based on an execution sequence of operation steps of a commissioning task in a commissioning template.

An example of the commissioning template is shown in Table 1, which may be in a form of Excel.

TABLE 1

| Item | Operation | Confirmation | T1 Region | M1 Judgment |
|---|---|---|---|---|
| Fire alarm system | 1) screen of a fire alarm host | None | | |
| | Close a [fire alarm] breaker for each vehicle | A normal condition is displayed on the screen of the fire alarm host without fault information of vehicle 1 to vehicle 8 | | |
| | Vehicle master controller works, | None | | |

TABLE 1-continued

| Item | Operation | Confirmation | T1 Region | M1 Judgment |
|---|---|---|---|---|
| | VCB OFF, confirming operation of the fire alarm host and each vehicle circuit module | | | |
| | 2) Measure Measure an output voltage of a power supply module for a circuit module | (25~60) V | | |
| | Measure line voltages at port A and port B (01, 02) of a circuit module in a switch board | (25~60) V | | |
| | 3) Fire alarm Release smoke at a monitoring port of a sensor (confirm one by one from vehicle 1) | At the fire alarm host, a fire alarm is triggered, and a displayed sensor position is correct A fire alarm indicator lamp of the fire alarm host flashes, and a fire alarm buzzer rings A fire alarm lamp of a circuit module in the switch board is lighted | | |

Table 1 illustrates commissioning task data as contents of item, operation, confirmation, region, and judgment, data of which may be stored in different tables in a database respectively. In order to facilitate transmission, the template may be converted into a data stream file (for example, in a form of XML) to be stored.

In Table 1, "Item" represents a commissioning task or a commissioning subtask for a commissioning procedure. That is, a whole commissioning procedure may include only one commissioning task or include multiple commissioning tasks. "Operation" represents operation steps required for performing the commissioning task. "Confirmation" represents information which needs to be confirmed after each of the operation steps. For example, "(25~60) V" represents to judge whether a voltage value is within a range of 25V to 60V. "Region" represents a position where an operation step is performed. "Judgment" represents a judgment result obtained by judging the confirmed information. "T1" and "M1" are vehicle numbers. More vehicle numbers may be added into the template according to practical conditions. Blank areas in the columns of "Region" and "Judgment" are interacting regions with a user.

In a case that the commissioning task is just started, the target operation step may be determined as the first operation step of the commissioning task. And in a case that an operation step is completed, the target operation step may be determined as an operation step next to the newly completed operation step in the commissioning template.

In step S12, commissioning task step information is sent to a terminal device for prompting to perform the target operation step.

The terminal device in the embodiment of the present disclosure is an intelligent terminal device, which is capable of communicating with the server in a wired or wireless manner.

Optionally, the terminal device may include a handheld terminal, such as a panel computer, or a handheld computer. After receiving the commissioning task step information from the server, the handheld terminal detects whether the user inputs data in the interacting regions corresponding to the current operation step, and sends a data steam to the server if it is detected that the user inputs data in the interacting regions corresponding to the current operation step. The data stream includes an attribute of transmitted data which are commissioning result information corresponding to the target operation step. The commissioning result information includes test data corresponding to the target operation step, the target operation step, the commissioning task to which the target operation step belongs, and an identifier of the terminal device sending the commissioning result information.

In the embodiment, the attribute of data includes but is not limited to a numeral quantity, an analog quantity, a conditional quantity and a timing quantity. The numeral quantity includes switch quantity data or state quantity data. The analog quantity includes data having a certain range, such as data of voltage, current, pressure, time or speed. The conditional quantity includes data obtained under a certain condition. The timing quantity includes data obtained during a certain time period.

In the embodiment, the commissioning result information further includes an identifier of the user of the handheld terminal, in order to identify the commissioner for facilitating management of commissioners.

The data inputted by the user may be a numerical value, such as 0, 1 or 20. The numerical value may be represented in the decade system, the binary system or other systems, which is not limited herein. The data may also be text data, such as "good", or "failed".

The terminal device may further include an instruction testing device. After receiving the commissioning task step information from the server, the instruction testing device monitors an operable component and/or a simulated system in the rail transit vehicle.

The operable component in the rail transit vehicle to be monitored by the instruction testing device may be determined in advance as required by the commissioning task. The instruction testing device may further simulate a system (such as a brake/traction system, a cab control system, or an operation state) in the rail transit vehicle, to reproduce practical operation of the real vehicle. The simulation may reproduce the actual running of the vehicle, thereby further improving the efficiency of commissioning. The simulated system to be monitored by the instruction testing device may be selected by the user.

When an action on the operable component corresponding to the current operation step and/or operation of the simulated system corresponding to the current operation step is monitored by the instruction testing device, the instruction testing device collects a first operation instruction signal triggered by the operable component and sends the first operation instruction signal to the server, and/or collects a second operation instruction signal triggered by the operation of the simulated system. Then the instruction testing device sends a data stream to the server. The data stream includes an attribute of transmitted data which are commissioning result information corresponding to the target operation step. The commissioning result information includes the first operation instruction signal and/or the second operation instruction signal, the target operation step, the commissioning task to which the target operation step belongs, and an equipment identifier of the instruction testing device. The first operation instruction signal and/or the second operation instruction signal are the test data corresponding to the target operation step.

Some commissioning tasks may only include an action on an operable component, i.e., an operation performed by the user on the operable component. Some commissioning tasks may only include operation of a simulated system. And some commissioning tasks may include both an action on an operable component and operation of a simulated system.

The terminal device may further include an intelligent meter, which is configured to measure an electrical parameter, such as a voltage, a current or a frequency. After receiving the commissioning task step information from the server, the intelligent meter sends a data stream to the server. The data stream includes an attribute of transmitted data which are commissioning result information corresponding to the target operation step. The commissioning result information includes measurement result data, the target operation step, the commissioning task to which the target operation step belongs, and an identifier of the intelligent meter. The measurement result data are the test data corresponding to the target operation step. The intelligent meter may activate an electrical parameter measuring function to measure an electrical parameter and send the commissioning result information to the server, only if the current operation step promoted in the commissioning task step information includes measuring the electrical parameter. Otherwise, the electrical parameter measuring function is shut off to reduce power consumption of the intelligent meter.

In step S13, a data stream is received from the terminal device. The data stream includes an attribute of transmitted data which are commissioning result information corresponding to the target operation step. The commissioning result information includes test data corresponding to the target operation step, the target operation step, the commissioning task to which the target operation step belongs, and an identifier of the terminal device sending the commissioning result information In the embodiment, data of different data attributes are encapsulated with different data organizing algorithm, in order to quickly find a matched parsing algorithm for the data stream and correctly parse the data stream to obtain the data of the corresponding data attribute.

In step S14, the received data stream is parsed to obtain the commissioning result information.

After the data stream corresponding to the target operation step is received, a data organizing algorithm may be determined based on the attribute of data carried in the data stream, and the data stream may be parsed to obtain the test data with the determined data organizing algorithm.

In step S15, it is judged whether the test data corresponding to the target operation step are correct based on a criterion corresponding to the target operation step. The criterion is determined based on an attribute of data of a rail transit vehicle static commissioning test.

In the embodiment, a criterion on test data corresponding to each operation step is determined and stored based on a data attribute and a commissioning requirement of the rail transit vehicle static test. Different data attributes correspond to different criterions. For example, a switch quantity may correspond to a criterion of whether the test data equals to 0, or 1. An analog quantity may correspond to a criterion of whether the test data is within a certain range. For example, the criterion may be whether a voltage value is within a normal range. Data of a same attribute may correspond to different criterions depending on different commissioning requirements.

After the data stream corresponding to the target operation step is received, the data organizing algorithm is determined based on the attribute of data carried in the data stream, the data stream is parsed to obtain the test data with the determined data organizing algorithm, and the test data are judged based on the criterion corresponding to the target operation step.

In step S16, in a case that it is judged that the test data corresponding to the target operation step are correct, judgment result information is sent to the terminal device, the judgment result is filled into the commissioning template, and the step of determining a target operation step based on an execution sequence of operation steps of a commissioning task in a commissioning template is performed.

In the embodiment, if it is judged that the test data corresponding to the target operation step are correct, the judgment result information is sent to the terminal device, the judgment result is filled into the commissioning template, and it continues to execute the step of determining a target operation step based on an execution sequence of operation steps of the commissioning task and subsequent steps in order to continue the subsequent commissioning procedure.

In step S17, in a case that it is judged that the test data corresponding to the target operation step are not correct, judgment result information is sent to the terminal device, and the judgment result is filled into the commissioning template.

In the embodiment, if it is judged that the test data corresponding to the target operation step are not correct, the judgment result information is sent to the terminal device and the judgment result is filled into the commission template, but the step of determining a target operation step based on an execution sequence of operation steps of the commissioning task and subsequent steps is no longer executed, i.e., stopping interacting with the terminal device.

In the method for automatically processing rail transit vehicle static test data according to the embodiment of the present disclosure, the target operation step is determined based on the execution sequence of the operation steps of the commissioning task in the commissioning template. The commissioning task step information is sent to the terminal device for prompting to perform the target operation step. After the commissioning result information corresponding to the target operation step is received from the terminal device, it is judged whether the test data in the commissioning result information are correct based the criterion corresponding to the target operation step. The criterion is determined based on the data attribute of the rail transit vehicle static test. If it is judged that the test data corresponding to the target operation step are correct, the judgment result information is sent to the terminal device, the judgment result is filled into the commissioning template, and the step of determining a target operation step based on an execution sequence of operation steps of the commissioning task is executed. If it is judged that the test data corresponding to the target operation step are not correct, the judgment result information is sent to the terminal device and the judgment result is filled into the commission template. In this way, the commissioning procedure, the commissioning result data and the judgment result made on the commissioning result data are associated with each other to automatically process the test data in the commissioning procedure, thereby improving the efficiency of commissioning.

In the above embodiment, optionally, the operation steps are ranked in accordance with the execution sequence and are expressed using a predetermined working procedure organizing algorithm in the commissioning template, which is more convenient for the commissioner to check.

In general, the operation steps of the commissioning task are not performed completely in series. For example the process may skip a step under a certain condition. Therefore, besides ranking the operation steps in the commissioning template in accordance with the execution sequence, the execution timing should also be considered. The predetermined working procedure organizing algorithm refers to a timing rule of the operation steps.

Optionally, the method for automatically processing rail transit vehicle static test data according to the embodiment of the present disclosure may further include:

pushing an updated commissioning template to the terminal device when the commissioning template is updated.

updating the commissioning template includes generating a new commissioning template based on new commissioning tasks, or modifying the existing commissioning template in a case that the commissioning procedure of a certain commissioning task needs to be changed. When the commissioning template is updated, the updated commissioning template may be actively sent to the terminal device.

Optionally, the method for automatically processing rail transit vehicle static test data according to the embodiment of the present disclosure may further include:

sending the commissioning template to a commissioning terminal which sends a commissioning template downloading request when the commissioning template downloading request is received from the terminal device.

Besides actively pushing the commissioning template to the terminal device, the terminal device may actively send a downloading request. The commissioning template is sent to the commissioning terminal which sends a commissioning template downloading request only when the commissioning template downloading request is received from the terminal device.

Figure 2:
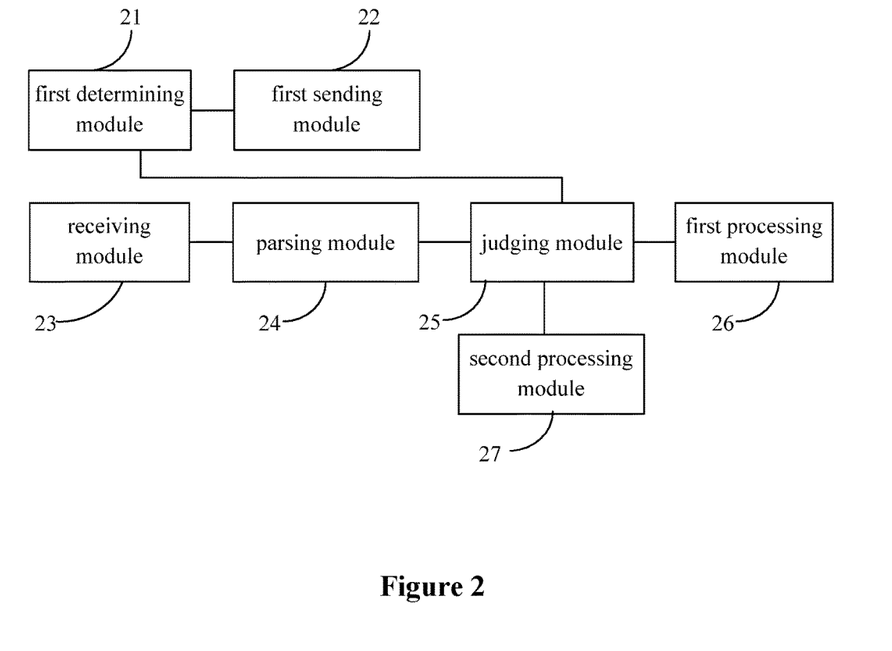
FIG. 2 is a structural schematic diagram of a device for automatically processing rail transit vehicle static test data according to an embodiment of the present disclosure.

A device for automatically processing rail transit vehicle static test data corresponding to the method in the above embodiment is further provided in the present disclosure. FIG. 2 shows a structural schematic diagram of the device for automatically processing rail transit vehicle static test data according to an embodiment of the present disclosure.

Referring the FIG. 2, the device may include a first determining module 21, a first sending module 22, a receiving module 23, a parsing module 24, a judging module 25, a first processing module 26 and a second processing module 27.

The first determining module 21 is configured to determine a target operation step based on an execution sequence of operation steps of a commissioning task in a commissioning template. The commissioning template includes the commissioning task, the operation steps of the commissioning task, the execution sequence of the operation steps, information which needs to be confirmed after each of the operation steps is performed, and an interacting region for filling a judgment result corresponding to confirmed information.

The first sending module 22 is configured to send commissioning task step information to a terminal device for prompting to perform the target operation step.

The receiving module 23 is configured to receive a data stream from the terminal device. The data stream includes an attribute of transmitted data which are commissioning result information corresponding to the target operation step. The commissioning result information includes test data corresponding to the target operation step, the target operation step, the commissioning task to which the target operation step belongs, and an identifier of the terminal device sending the commissioning result information.

The parsing module 24 is configured to parse the received data stream to obtain the commissioning result information.

The judging module 25 is configured to judge whether the test data corresponding to the target operation step are correct based on a criterion corresponding to the target operation step. The criterion is determined based on an attribute of data of a rail transit vehicle static commissioning test.

The first processing module 26 is configured to send judgment result information to the terminal device, fill the judgment result into the commissioning template and trigger the first determining module 21 to perform the step of determining a target operation step based on an execution sequence of operation steps of a commissioning task in a commissioning template, if the judging module 25 judges that the test data corresponding to the target operation step are correct.

The second processing module 27 is configured to send judgment result information to the terminal device, and fill the judgment result into the commissioning template, if the judging module 25 judges that the test data corresponding to the target operation step are not correct.

Preferably, the operation steps are ranked in accordance with the execution sequence and are expressed using a predetermined working procedure organizing algorithm in the commissioning template.

In the device for automatically processing rail transit vehicle static test data according to the embodiment of the present disclosure, the target operation step is determined based on the execution sequence of the operation steps of the commissioning task in the commissioning template. The commissioning task step information is sent to the terminal device for prompting to perform the target operation step. After the commissioning result information corresponding to the target operation step is received from the terminal device, it is judged whether the test data in the commissioning result information are correct based the criterion corresponding to the target operation step. The criterion is determined based on the data attribute of the rail transit vehicle static test. If it is judged that the test data corresponding to the target operation step are correct, the judgment result information is sent to the terminal device, the judgment result is filled into the commissioning template, and the step of determining a target operation step based on an execution sequence of operation steps of the commissioning task is executed. If it is judged that the test data corresponding to the target operation step are not correct, the judgment result information is sent to the terminal device and the judgment result is filled into the commission template. In this way, the commissioning procedure, the commissioning result data and the judgment result made on the commissioning result data are associated with each other to automatically process the test data in the commissioning procedure, thereby improving the efficiency of commissioning.

On the basis of the embodiment as shown in FIG. 2, the device for automatically processing rail transit vehicle static test data according to the embodiment of the present disclosure may further include:

a pushing module configured to push an updated commissioning template to the terminal device when the commissioning template is updated.

On the basis of the embodiment as shown in FIG. 2, the device for automatically processing rail transit vehicle static test data according to the embodiment of the present disclosure may further include:

a second sending module configured to send the commissioning template to a commissioning terminal which sends a commissioning template downloading request when the commissioning template downloading request is received from the terminal device.

The parsing module 24 in the embodiment may include:

a determining unit configured to determine a data organizing algorithm based on the attribute of transmitted data carried in the data stream; and a parsing unit configured to parse the data stream to obtain the test data based on the determined data organizing algorithm.

It may be known by those skilled in the art that, units and steps in each example described in conjunction with the embodiments disclosed herein can be realized by electronic hardware, computer software or a combination thereof. Whether the function is executed in a hardware way or in a software way depends on application of the technical solution and design constraint conditions. Those skilled in the art can use different method for each application to realize the described function, and this is not considered to be beyond the scope of the application.

In the embodiments according to the present application, it should be understood that the disclosed device and method may be implemented in other ways. For example, the system embodiments described above are only schematic. For example, the device is divided based on a logic function thereof, and they may be divided in another way in practice. For example, multiple devices or modules may be combined or integrated into another device, or some features may be omitted or not performed. In addition, a coupling, a direct coupling or a communication connection between displayed or discussed constitutional components may be an indirect coupling or communication connection via some interfaces, devices or modules, and may be in an electrical form, a mechanical form or another form.

In addition, each function unit according to each embodiment of the present application may be integrated into one processing unit, or may be a separate unit physically, or two or more units are integrated into one unit.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A method for processing rail transit vehicle static test data, comprising:
   determining, by a server, a target operation step based on an execution sequence of operation steps of a commissioning task in a commissioning template, wherein the commissioning template comprises the commissioning task, the operation steps of the commissioning task, the execution sequence of the operation steps, information which needs to be confirmed after each of the operation steps is performed, and an interacting region for filling a judgment result corresponding to the confirmed information;
   sending, by the server, commissioning task step information to a terminal device for prompting the terminal device to perform the target operation step, wherein the terminal device comprises an instruction testing device which monitors an operable component in the rail transit vehicle and collects an operation instruction signal triggered by the operable component as test data corresponding to the target operation step;
   receiving, by the server, a data stream from the terminal device, wherein the data stream comprises commissioning result information corresponding to the target operation step and an attribute corresponding to the commissioning result information, and the commissioning result information comprises the test data corresponding to the target operation step, the target operation step, the commissioning task to which the target operation step belongs, and an identifier of the terminal device sending the commissioning result information;
   determining, by the server, a data organizing algorithm based on the attribute;
   parsing, by the server, the received data stream to obtain the commissioning result information, based on the data organizing algorithm;
   determining, by the server, a criterion corresponding to the target operation step based on the attribute;
   judging, by the server, whether the test data corresponding to the target operation step are correct based on the criterion corresponding to the target operation step;
   sending, by the server, judgment result information to the terminal device;
   filling, by the server, the judgment result into the commissioning template and performing the step of determining a target operation step based on an execution sequence of operation steps of a commissioning task in a commissioning template, in a case that it is judged that the test data corresponding to the target operation step are correct; and
   sending the judgment result information to the terminal device and filling the judgment result into the commissioning template, in a case that it is judged that the test data corresponding to the target operation step are not correct.

2. The method according to claim 1, wherein the operation steps are ranked in accordance with the execution sequence and are expressed using a predetermined working procedure organizing algorithm in the commissioning template.

3. The method according to claim 1, further comprising pushing an updated commissioning template to the terminal device when the commissioning template is updated.

4. The method according to claim 1, further comprising sending the commissioning template to a commissioning terminal which sends a commissioning template downloading request when the commissioning template downloading request is received from the terminal device.

5. The method according to claim 1, wherein the attribute includes at least one of a numeral quantity, an analog quantity, a conditional quantity or a timing quantity,
   the method further comprising:
   determining a next target operation step based on the execution sequence of the operation steps of the commissioning task in the commissioning template, in a case that it is judged that the test data corresponding to the target operation step are correct.

6. A device for processing rail transit vehicle static test data, comprising:
   one or more processors; and
   a memory having code stored therein,
   wherein when the one or more processors execute the code the one or more processors are configured into a plurality of modules comprising:
   a first determining module, configured to determine a target operation step based on an execution sequence of operation steps of a commissioning task in a commissioning template, wherein the commissioning template comprises the commissioning task, the operation steps of the commissioning task, the execution sequence of the operation steps, information which needs to be confirmed after each of the operation steps is performed, and an interacting region for filling a judgment result corresponding to the confirmed information;

a first sending module, configured to send commissioning task step information to a terminal device for prompting the terminal device to perform the target operation step, wherein the terminal device comprises an instruction testing device which monitors an operable component in the rail transit vehicle and collects an operation instruction signal triggered by the operable component as test data corresponding to the target operation step;

a receiving module, configured to receive a data stream from the terminal device, wherein the data stream comprises commissioning result information corresponding to the target operation step and an attribute corresponding to the commissioning result information, and the commissioning result information comprises the test data corresponding to the target operation step, the target operation step, the commissioning task to which the target operation step belongs, and an identifier of the terminal device sending the commissioning result information;

a parsing module, configured to determine a data organizing algorithm based on the attribute and parse the received data stream to obtain the commissioning result information based on the data organizing algorithm;

a judging module, configured to determine a criterion corresponding to the target operation step based on the attribute and judge whether the test data corresponding to the target operation step are correct based on the criterion corresponding to the target operation step;

a processing module, configured to send judgment result information to the terminal device, fill the judgment result into the commissioning template and trigger the first determining module to perform the step of determining a target operation step based on an execution sequence of operation steps of a commissioning task in a commissioning template, in a case that the judging module judges that the test data corresponding to the target operation step are correct; and a second processing module, configured to send the judgment result information to the terminal device, and fill the judgment result into the commissioning template, in a case that the judging module judges that the test data corresponding to the target operation step are not correct.

7. The device according to claim 6, wherein the attribute includes at least one of a numeral quantity, an analog quantity, a conditional quantity or a timing quantity, the first determining module being further configured to determine a next target operation step based on the execution sequence of the operation steps of the commissioning task in the commissioning template, in a case that the judging module judges that the test data corresponding to the target operation step are correct.

8. The device according to claim 6, wherein the operation steps are ranked in accordance with the execution sequence and are expressed using a predetermined working procedure organizing algorithm in the commissioning template.

9. The device according to claim 6, further comprising a pushing module configured to push an updated commissioning template to the terminal device when the commissioning template is updated.

10. The device according to claim 6, further comprising a second sending module configured to send the commissioning template to a commissioning terminal which sends a commissioning template downloading request when the commissioning template downloading request is received from the terminal device.

* * * * *